(12) United States Patent
Zhang et al.

(10) Patent No.: US 12,327,304 B2
(45) Date of Patent: Jun. 10, 2025

(54) VIDEO GENERATION METHOD, APPARATUS, DEVICE AND STORAGE MEDIUM

(71) Applicant: Beijing Zitiao Network Technology Co., Ltd., Beijing (CN)

(72) Inventors: Wenwen Zhang, Beijing (CN); Yingzhao Sun, Beijing (CN); Feiyu Xia, Beijing (CN); Xueqiang Ma, Beijing (CN); Xuyang Bu, Beijing (CN); Mingwei Zhao, Beijing (CN); Lei Shi, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/629,614

(22) Filed: Apr. 8, 2024

(65) Prior Publication Data
US 2024/0257428 A1 Aug. 1, 2024

Related U.S. Application Data

(63) Continuation of application No. PCT/CN2022/120050, filed on Sep. 21, 2022.

(30) Foreign Application Priority Data

Oct. 22, 2021 (CN) .......................... 202111234266.9

(51) Int. Cl.
*G06T 11/60* (2006.01)
*G06T 13/20* (2011.01)
(Continued)

(52) U.S. Cl.
CPC ............ *G06T 11/60* (2013.01); *G06T 13/205* (2013.01); *G06T 13/80* (2013.01); *G09G 5/14* (2013.01); *G11B 27/031* (2013.01)

(58) Field of Classification Search
None
See application file for complete search history.

(56) References Cited

U.S. PATENT DOCUMENTS

2007/0256545 A1* 11/2007 Lee .......................... H04H 60/27
84/610
2011/0163969 A1* 7/2011 Anzures .............. G06F 3/04883
345/173
(Continued)

FOREIGN PATENT DOCUMENTS

CN 107770596 A 3/2018
CN 108668164 A 10/2018
(Continued)

OTHER PUBLICATIONS

International Search Report and Written Opinion for PCT/CN2022/120050, mailed Dec. 6, 2022, 12 pages.
(Continued)

*Primary Examiner* — Joni Hsu
(74) *Attorney, Agent, or Firm* — Astute IP Law Group (57) ABSTRACT

The present disclosure provides a video generation method, an apparatus, a device and a storage medium. The method includes: firstly, when a selection operation for a target music is received, an atmosphere effect corresponding to the target music is displayed on a capturing page, and when a trigger operation for a capturing control on the capturing page is received, a target result video is generated based on the displayed atmosphere effect, where the audio in the target result video is obtained based on the target music, and the atmosphere effect corresponding to the target music is determined based on characteristics of the target music.

12 Claims, 4 Drawing Sheets

(51) Int. Cl.
  *G06T 13/80*   (2011.01)
  *G09G 5/14*    (2006.01)
  *G11B 27/031*  (2006.01)

(56) References Cited

U.S. PATENT DOCUMENTS

| | | | |
|---|---|---|---|
| 2013/0262634 A1* | 10/2013 | Chang | H04N 21/6543 |
| | | | 709/219 |
| 2015/0058733 A1* | 2/2015 | Novikoff | G11B 27/038 |
| | | | 715/723 |
| 2016/0189667 A1* | 6/2016 | Kim | G06F 3/162 |
| | | | 345/619 |
| 2018/0053379 A1 | 2/2018 | Meyer | |
| 2020/0251146 A1* | 8/2020 | St. John Brislin | A63F 13/497 |
| 2020/0351450 A1 | 11/2020 | Kim et al. | |
| 2020/0413162 A1* | 12/2020 | Hao | H04N 21/4788 |
| 2021/0074067 A1* | 3/2021 | Kwon | G06F 3/16 |
| 2021/0084388 A1 | 3/2021 | Kunsberg | |
| 2021/0297604 A1 | 9/2021 | Matiossian | |
| 2022/0051448 A1 | 2/2022 | Steinwedel et al. | |
| 2023/0066179 A1* | 3/2023 | Berger | H04L 51/10 |

FOREIGN PATENT DOCUMENTS

| | | |
|---|---|---|
| CN | 108900791 A | 11/2018 |
| CN | 111277761 A | 6/2020 |
| CN | 113079419 A | 7/2021 |
| CN | 113302945 A | 8/2021 |
| EP | 4304187 A1 | 1/2024 |
| JP | H09160574 A | 6/1997 |
| JP | 2004363994 A | 12/2004 |
| JP | 2015125270 A | 7/2015 |
| JP | 2017038344 A | 2/2017 |
| WO | 2020117823 A1 | 11/2020 |

OTHER PUBLICATIONS

Extended European Search Report for European Patent Application No. 22882546.9, mailed on Nov. 21, 2024, 9 pages.

First Office Action for Chinese Patent Application No. 202111234266.9, mailed on Feb. 27, 2025, 16 pages.

Notice of Reasons for Refusal for Japanese Patent Application No. 2024-521129, mailed on Mar. 18, 2025, 12 pages.

* cited by examiner

VIDEO GENERATION METHOD, APPARATUS, DEVICE AND STORAGE MEDIUM

CROSS-REFERENCE TO RELATED APPLICATION

The present application is a continuation of International Patent Application No. PCT/CN2022/120050, filed on Sep. 21, 2022, which claims the priority to and benefits of the Chinese Patent Application No. 202111234266.9, filed on Oct. 22, 2021 and titled "VIDEO GENERATION METHOD, APPARATUS, DEVICE AND STORAGE MEDIUM". All the aforementioned patent applications are hereby incorporated by reference in their entireties.

TECHNICAL FIELD

The present disclosure relates to the field of data processing, in particular to a video generation method, an apparatus, a device and a storage medium.

BACKGROUND

With the continuous development of short video technology on the Internet, people's demand for video capturing functions is becoming more and more diversified. For example, the karaoke recording function, which refers to the function of providing users with original song accompaniment and native singing, supports users to record karaoke songs and complete video capturing. However, the current karaoke recording function is relatively simple.

Therefore, how to enrich the gameplay of video capturing function to enhance user's experience for video capturing, is an urgent technical problem.

SUMMARY

In order to solve the above technical problems or at least partially solve the above technical problems, embodiments of the present disclosure provide a video generation method, which can enrich the gameplay of video capturing functions and enhance user's experience for video capturing.

In a first aspect, the present disclosure provides a video generation method, the method includes:
displaying an atmosphere effect corresponding to a target music on a capturing page in response to a selection operation of the target music; wherein the atmosphere effect corresponding to the target music is determined based on characteristics of the target music;
generating a target result video based on the atmosphere effect in response to a trigger operation for a capturing control on the capturing page; the audio in the target result video is obtained based on the target music.

In an optional implementation, before generating the target result video based on the atmosphere effect in response to the trigger operation for the capturing control on the capturing page, the method further includes:
displaying a first canvas and a second canvas on the capturing page in response to a trigger operation for a preset co-capturing control on the capturing page; the first canvas is configured to render a capturing picture of a front camera, and the second canvas is configured to render a capturing picture of a rear camera;
correspondingly, generating the target result video based on the atmosphere effect in response to the trigger operation for the capturing control on the capturing page includes:
generating the target result video based on the capturing picture on the first canvas, the capturing picture on the second canvas and the atmosphere effect in response to the trigger operation for the capturing control on the capturing page.

In an optional implementation, before generating the target result video based on the atmosphere effect, the method further includes:
displaying evaluation props on the capturing page based on audio data that is input from a microphone in a process of video capturing; the evaluation props are determined based on a matching degree between the audio data and the target music;
correspondingly, generating the target result video based on the atmosphere effect in response to the trigger operation for the capturing control on the capturing page includes:
generating the target result video based on the evaluation props and the atmosphere effect in response to the trigger operation for the capturing control on the capturing page.

In an optional implementation, after the generating the target result video based on the atmosphere effect, the method further includes:
jumping from the capturing page to a video editing page in response to a trigger operation for a preset ending capturing control on the capturing page; the target result video is displayed on the video editing page;
determining a target sticker effect based on a lyric information corresponding to the target music, and synthesizing the target sticker effect into the target result video that is displayed on the video editing page according to a preset display style to obtain a synthesized result video.

In an optional implementation, after jumping from the capturing page to the video editing page in response to the trigger operation for the preset ending capturing control on the capturing page, the method further includes:
starting timing upon detecting the jumping from the capturing page to the video editing page;
displaying a preset reminding effect on the video editing page at the end of the timing in a case where a publishing operation is not detected in a process of the timing; the preset reminding effect is configured to remind a user to trigger the publishing operation for the synthesized result video.

In an optional implementation, the method further includes:
displaying a comment prop corresponding to a comment operation on a play page of a first video in response to the comment operation for the first video; the first video and the target result video belong to a same video type.

In an optional implementation, the atmosphere effect includes at least one selected from a background effect, a prop effect and a lighting effect, and the prop effect includes at least one selected from a smoke effect, a musical instrument effect and a user prop effect.

In an optional implementation, the characteristics of the target music include a genre of the target music and/or a preference group corresponding to the target music.

In a second aspect, the present disclosure provides a video generation apparatus, the apparatus includes:
a display processor, configured to display an atmosphere effect corresponding to a target music on a capturing page in response to a selection operation of the target music; the atmosphere effect corresponding to the target music is determined based on characteristics of the target music;

a generating processor, configured to generate a target result video based on the atmosphere effect in response to a trigger operation for a capturing control on the capturing page; the audio in the target result video is obtained based on the target music.

In a third aspect, the present disclosure provides a computer-readable storage medium, instructions are stored on the computer-readable storage medium, and the instructions, upon being executed by a terminal device, cause the terminal device to implement the above method.

In a fourth aspect, the present disclosure provides a device, including a memory, a processor, and computer program that is stored on the memory and executable on the processor; the processor, upon executing the computer program, implements the above method.

In a fifth aspect, the present disclosure provides a computer program product, the computer program product includes computer program/instructions, the computer program/instructions, upon being executed by a processor, implements the above method.

Compared with the prior art, the technical solution provided by the embodiments of the present disclosure have at least the following advantages:

Embodiments of the present disclosure provide a video generation method. Firstly, when a selection operation for a target music is received, an atmosphere effect corresponding to the target music is displayed on a capturing page, and when a trigger operation for a capturing control on the capturing page is received, a target result video is generated based on the displayed atmosphere effect, where the audio in the target result video is obtained based on the target music, and the atmosphere effect corresponding to the target music is determined based on characteristics of the target music. When the video recording is realized based on the target music, the embodiments of the present disclosure can generate the target result video with the atmosphere effect related to the characteristics of the target music. It can be seen that the embodiments of the present disclosure can enrich the gameplay of the video capturing function and enhance user's experience for video capturing.

BRIEF DESCRIPTION OF THE DRAWINGS

The accompanying drawings, which are hereby incorporated in and constitute a part of the present description, illustrate embodiments of the present disclosure, and together with the description, serve to explain the principles of the embodiments of the present disclosure.

To describe the technical solutions in the embodiments of the present disclosure or in the prior art more clearly, the accompanying drawings required in the description of the embodiments or the prior art will be described briefly below. Apparently, other accompanying drawings can also be derived from these drawings by those ordinarily skilled in the art without creative efforts.

DETAILED DESCRIPTION

To provide a clearer understanding of the objectives, features, and advantages of the embodiments of the present disclosure, the solutions in the embodiments of the present disclosure will be further described below. It should be noted that the embodiments in the present disclosure and features in the embodiments may be combined with one another without conflict.

Many specific details are described below to help fully understand the embodiments of the present disclosure. However, the embodiments of the present disclosure may also be implemented in other manners different from those described herein. Apparently, the described embodiments in the specification are merely some rather than all of the embodiments of the present disclosure.

In order to meet the diversified demands of users for video capturing, embodiments of the present disclosure provide a video generation method, specifically, when a selection operation for a target music is received, an atmosphere effect corresponding to the target music is displayed on a capturing page, and when a trigger operation for a capturing control on the capturing page is received, a target result video is generated based on the displayed atmosphere effect, where the audio in the target result video is obtained based on the target music, and the atmosphere effect corresponding to the target music is determined based on characteristics of the target music.

When the video recording is realized based on the target music, the embodiments of the present disclosure can generate the target result video with the atmosphere effect related to the characteristics of the target music. It can be seen that the embodiments of the present disclosure can enrich the gameplay of the video capturing function and enhance user's experience for video capturing.

Figure 1:
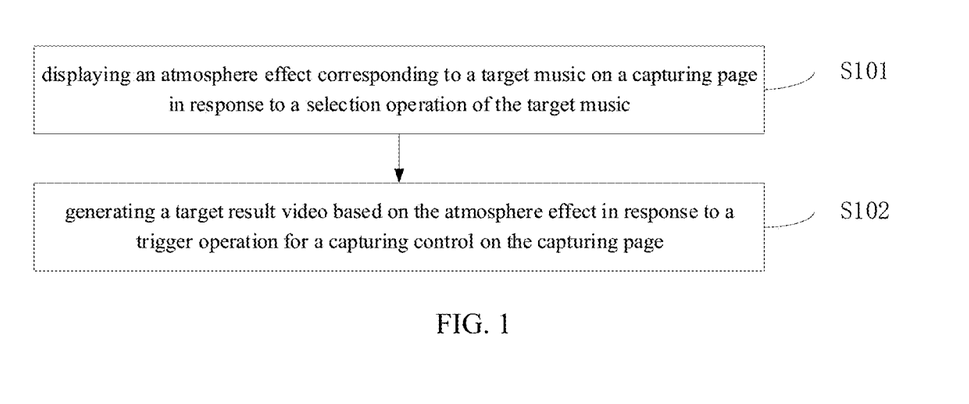
FIG. 1 is a flowchart of a video generation method provided by embodiments of the present disclosure.

Based on this, embodiments of the present disclosure provide a video generation method. Referring to FIG. 1, which is a flowchart of a video generation method provided by embodiments of the present disclosure, the method includes:

S101: displaying an atmosphere effect corresponding to a target music on a capturing page in response to a selection operation of the target music.

The atmosphere effect corresponding to the target music is determined based on characteristics of the target music.

In an embodiment of the present disclosure, the target music may be any type of music, and generally, the target music includes at least one song.

The characteristics of the target music may include a genre of the target music and/or a preference group corresponding to the target music. The genre of the target music may be pop music, hip hop music, etc., and the preference group corresponding to the target music may be teenagers, middle-aged people, elderly people, male crowd or female crowd.

In an alternative embodiment, the atmosphere effect corresponding to the target music may be determined based on the genre to which the target music belongs. For example, assuming that the target music is the genre of hip-hop, the effect of hip-hop elements may be determined as the atmosphere effect corresponding to the target music.

In another alternative embodiment, the atmosphere effect corresponding to the target music may be determined based on the preference group corresponding to the target music. For example, assuming that the preference group corresponding to the target music is the female crowd, the effect of female elements may be determined as the atmosphere effect corresponding to the target music. Specifically, the preference group corresponding to the target music may be determined by counting the number of people in each crowd who trigger behaviors such as collections or likes for the target music.

In another alternative embodiment, the atmosphere effect corresponding to the target music may be determined based on the genre to which the target music belongs and the preference group corresponding to the target music. For example, assuming that the genre of the target music is pop music and the preference group corresponding to the target music is teenagers, the elements in popular elements that conform to the style of teenagers may be determined as the atmosphere effect corresponding to the target music.

In practical application, after receiving the selection operation for the target music, the lyric information of the target music is displayed on the capturing page, and the atmosphere effect corresponding to the target music is displayed on the capturing page. The atmosphere effect includes combination of one or more of background effect, prop effect and lighting effect. In addition, prop effect includes one or more combinations of smoke effect, musical instrument effect and user prop effect.

Figure 2:
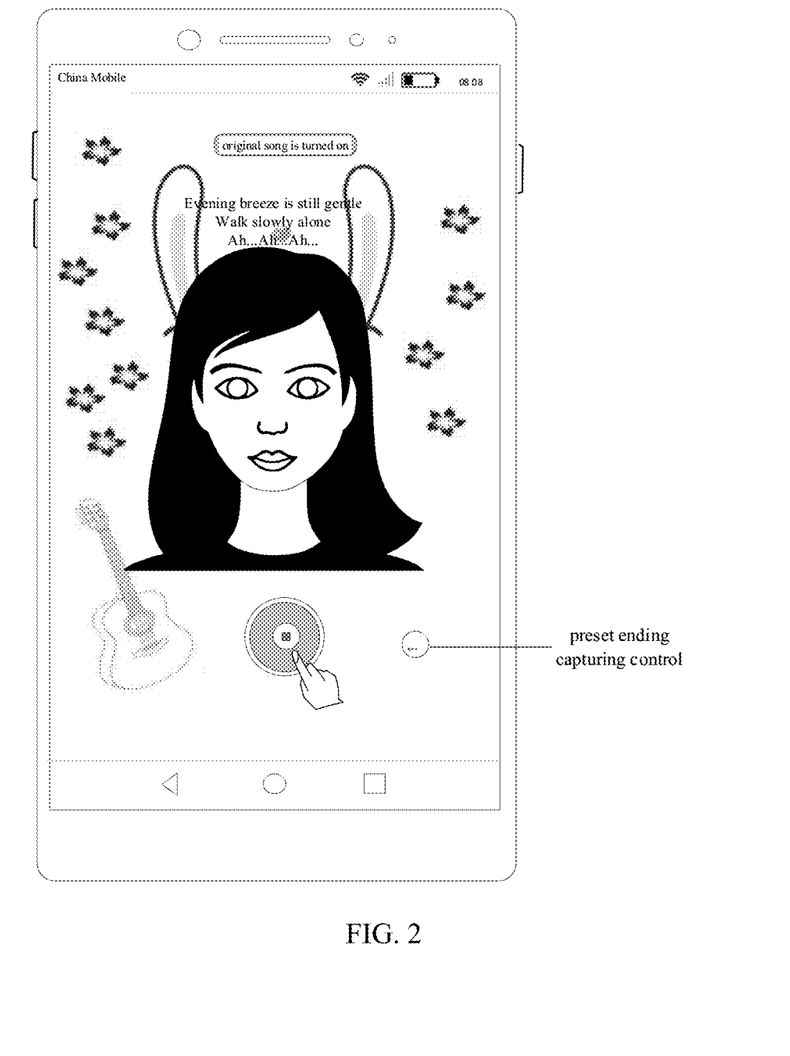
FIG. 2 is a schematic diagram of a capturing page provided by embodiments of the present disclosure.

As shown in FIG. 2, which is a schematic diagram of a capturing page provided by embodiments of the present disclosure, the musical instrument effect (such as guitar, microphone, earphone, etc.) and user prop effect (such as rabbit ears), etc. corresponding to the target music are displayed on the capturing page, in addition, the capturing page may also include background effect, lighting effect, smoke effect, etc. that are not shown in FIG. 2.

S102: generating a target result video based on the atmosphere effect in response to a trigger operation for a capturing control on the capturing page.

The audio in the target result video is obtained based on the target music.

In an embodiment of the present disclosure, under the condition of displaying the atmosphere effect on the capturing page, a user can trigger the Karaoke recording function based on the target music, thereby generating the target result video of Karaoke recording. The target result video includes not only the pictures captured by the camera, but also the atmosphere effect displayed on the capturing page.

In an alternative embodiment, the capturing page not only displays the pictures captured by the camera, but also displays the atmosphere effect. When the trigger operation for the capturing control is received, it means that the karaoke recording is ended. At this time, the atmosphere effect may be synthesized into the capturing pictures displayed on the capturing page to generate the target result video.

In the video generation method provided by the embodiment of the present disclosure, firstly, when a selection operation for a target music is received, an atmosphere effect corresponding to the target music is displayed on a capturing page, and when a trigger operation for a capturing control on the capturing page is received, a target result video is generated based on the displayed atmosphere effect, where the audio in the target result video is obtained based on the target music, and the atmosphere effect corresponding to the target music is determined based on characteristics of the target music. When the video recording is performed based on the target music, the embodiments of the present disclosure can generate the target result video with the atmosphere effect related to the characteristics of the target music. It can be seen that the embodiments of the present disclosure can enrich the gameplay of the video capturing function and enhance user's experience for video capturing.

Figure 3:
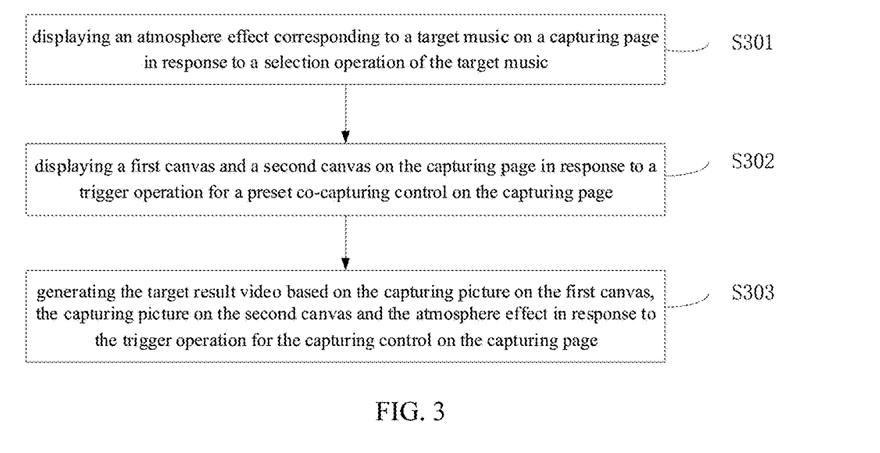
FIG. 3 is a flowchart of another video generation method provided by embodiments of the present disclosure.

On the basis of the above embodiments, in order to further enrich the gameplay of the video capturing function, embodiments of the present disclosure also provide a video generation method. Referring to FIG. 3, which is a flowchart of another video generation method provided by embodiments of the present disclosure, specifically, the method includes:

S301: displaying an atmosphere effect corresponding to a target music on a capturing page in response to a selection operation of the target music.

The atmosphere effect corresponding to the target music is determined based on characteristics of the target music.

The implementation process of S301 in embodiments of the present disclosure is the same as that of S101 in the above-mentioned embodiments, which can be understood by reference and will not be repeated here.

S302: displaying a first canvas and a second canvas on the capturing page in response to a trigger operation for a preset co-capturing control on the capturing page.

The first canvas is configured to render a capturing picture of a front camera, and the second canvas configured to render a capturing picture of a rear camera.

In an embodiment of the present disclosure, a preset co-capturing control is set on the capturing page, and when the trigger operation for the preset co-capturing control is received on the capturing page, the first canvas and the second canvas are displayed on the capturing page. Specifically, display layout of the first canvas and the second canvas on the capturing page is not limited, and may be an up-and-down display layout, a left-and-right display layout or a picture-in-picture display layout.

Figure 4:
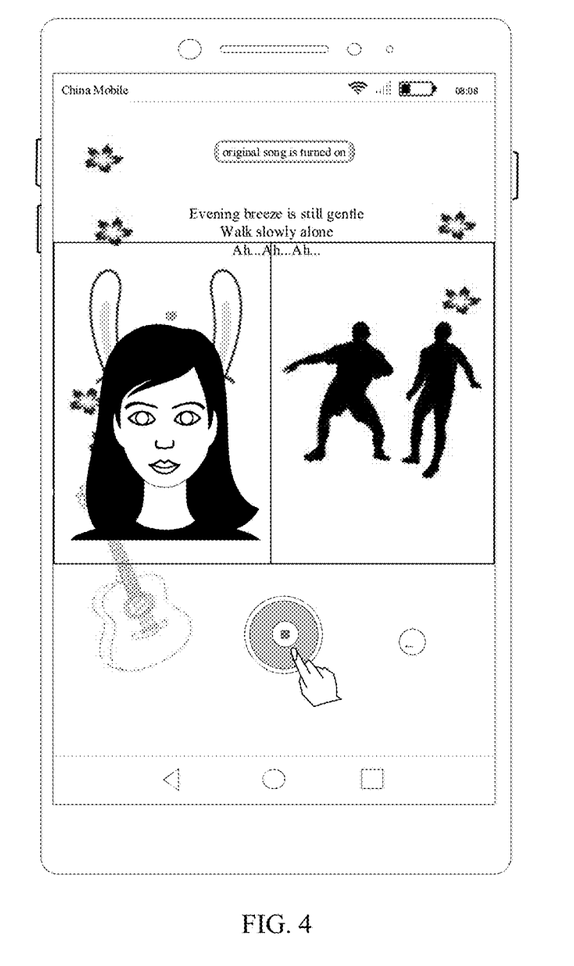
FIG. 4 is a schematic diagram of another capturing page provided by embodiments of the present disclosure.

Referring to FIG. 4, which is a schematic diagram of another capturing page provided by embodiments of the present disclosure, a first canvas (assuming on the left side) and a second canvas (assuming on the right side) are displayed in a left-and-right display layout on the capturing page. Taking the first canvas on the left side being configured to render the capturing picture of the front camera, and the second canvas on the right side being configured to render the capturing picture of the rear camera as examples, after the user clicks a capturing control, the front camera and the rear camera simultaneously realize video recording, and render the pictures captured by the cameras to the corresponding canvases in real time.

S303: generating the target result video based on the capturing picture on the first canvas, the capturing picture on the second canvas and the atmosphere effect in response to the trigger operation for the capturing control on the capturing page.

In an embodiment of the present disclosure, when the user clicks the capturing control again, the target result video may be generated based on the capturing picture on the first canvas, the capturing picture on the second canvas and the atmosphere effect displayed on the capturing page. The target result video not only contains the atmosphere effect related to the characteristics of the target music, but also contains the co-capturing effect of the capturing picture of the front camera and the capturing picture of the rear camera.

In an alternative embodiment, the capturing picture on the first canvas, the capturing picture on the second canvas and the atmosphere effect displayed on the capturing page may be combined into the same video to obtain the target result video.

The target result video generated by the video generation method provided by the embodiments of the present disclosure can not only contain the atmosphere effect related to the characteristics of the target music, but also realize the co-capturing effect of the capturing picture of the front camera and the capturing picture of the rear camera. It can be seen that the embodiments of the present disclosure can further enrich the gameplay of the video capturing function and enhance user's experience for video capturing.

In addition, in the karaoke recording scene, embodiments of the present disclosure may also evaluate audio data input from a microphone, such as scoring and rating, etc., thereby displaying evaluation props on the capturing page based on the evaluation results.

In practical application, in the process of video capturing, evaluation props are displayed on the capturing page based on the audio data input from the microphone, the evaluation props are determined based on a matching degree between the input audio data and the target music. Then, after receiving the trigger operation for the capturing control on the capturing page, the target result video is generated based on the evaluation props and the atmosphere effect.

For example, if the score is high based on the audio data input from the microphone, evaluation props such as flowers and applause may be thrown to the singer on the capturing page; if the score is low based on the audio data input from the microphone, evaluation props such as mineral water bottles may be thrown to the singer on the capturing page.

The target result video generated by the video generation method provided by the embodiments of the present disclosure can not only contain atmosphere effect related to the characteristics of the target music, but also include evaluation props with throwing effect, etc., which further enriches the gameplay of video capturing function and enhances user's experience for video capturing.

On the basis of the above embodiments, after the target result video is generated based on the atmosphere effect displayed on the capturing page, it can be jumped from the capturing page to a video editing page to realize an editing function for the target result video.

Figure 5:
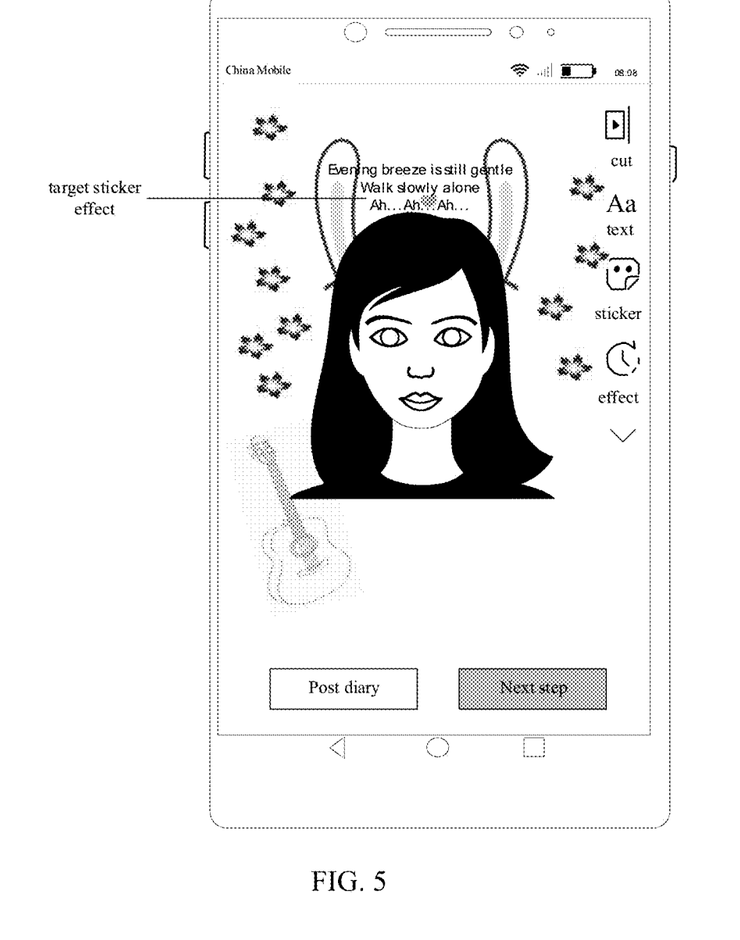
FIG. 5 is a schematic diagram of a video editing page provided by embodiments of the present disclosure.

Referring to FIG. 5, which is a schematic diagram of a video editing page provided by embodiments of the present disclosure, when a trigger operation for a preset ending capturing control on the capturing page shown in FIG. 2 is received, it can be jumped from the capturing page shown in FIG. 2 to the video editing page shown in FIG. 5, and the target result video is previewed and displayed on the video editing page.

In order to improve the display effect of the target result video, embodiments of the present disclosure can also automatically edit the target result video previewed on the video editing page based on a lyric information corresponding to the target music.

Specifically, lyrics with higher weight may be extracted from the lyric information corresponding to the target music, and a target sticker effect may be determined based on the lyrics, for example, the target sticker effect with the lyrics may be determined. Then, the target sticker effect is synthesized into the target result video according to a preset display style to obtain a synthesized result video. For example, the preset display style may be a randomly dropped display style, specifically, the target sticker effect may be randomly dropped.

The target result video generated by the video generation method provided by the embodiments of the present disclosure not only contains the atmosphere effect related to the characteristics of the target music, but also contains the effect of randomly dropping the target sticker effect related to the lyrics, thus further enriching the gameplay of the video capturing function and enhancing user's experience for video capturing.

In addition, in order to remind the user to release the target result video in time, the timing may be started when jumping from the capturing page to the video editing page is detected. If a publishing operation is not detected in a process of the timing, a preset reminding effect will be displayed on the video editing page. The preset reminding effect is configured to remind the user to trigger the publishing operation for the synthesized result video.

In an alternative embodiment, if the publishing operation for the target result video is not detected within 5 seconds after jumping to the video editing page, the effect of bomb explosion may be displayed on the video editing page to remind the user to trigger the publishing operation for the synthesized result video.

It is worth noting that the embodiments of the present disclosure do not restrict the way of displaying the preset reminding effect.

In addition, in the process of video browsing, when a comment operation for a first video is received, a comment prop corresponding to the comment operation may be displayed on a play page of the first video. The first video and the target result video belong to the same video type, for example, they are both recorded from karaoke.

In an alternative embodiment, comments on the first video may be realized through comment props such as flower props, poop props and green tongue props. In addition, user may click the comment props displayed on the play page for many times to achieve the effect of infinite ejection, which increases the interest of video comments.

It can be seen that the embodiments of the present disclosure can enhance the interactivity in the video browsing process and enhance the video interaction experience of users.

Figure 6:
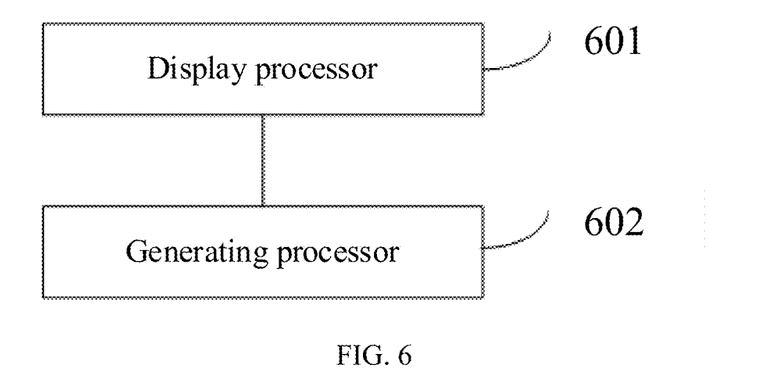
FIG. 6 is a schematic structural diagram of a video generation apparatus provided by embodiments of the present disclosure.

Based on the embodiments of the above method, the present disclosure also provides a video generation device. Referring to FIG. 6, which is a structural schematic diagram of a video generation apparatus provided by embodiments of the present disclosure, and the apparatus includes:
  a display processor 601, configured to display an atmosphere effect corresponding to a target music on a capturing page in response to a selection operation of the target music; the atmosphere effect corresponding to the target music is determined based on characteristics of the target music;
  a generating processor 602, configured to generate a target result video based on the atmosphere effect in response to a trigger operation for a capturing control on the capturing page; the audio in the target result video is obtained based on the target music.

In an alternative embodiment, the apparatus further includes:
  a first display processor, configured to display a first canvas and a second canvas on the capturing page in response to a trigger operation for a preset co-capturing control on the capturing page; the first canvas is configured to render a capturing picture of a front camera, and the second canvas is configured to render a capturing picture of a rear camera;

correspondingly, the generating processor is specifically configured to:

generate the target result video based on the capturing picture on the first canvas, the capturing picture on the second canvas and the atmosphere effect in response to the trigger operation for the capturing control on the capturing page.

In an alternative embodiment, the apparatus further includes:

a second display processor, configured to display evaluation props on the capturing page based on audio data input from a microphone in a video capturing process; the evaluation props are determined based on a matching degree between the audio data and the target music;

correspondingly, the generating processor is specifically configured to:

generate the target result video based on the evaluation props and the atmosphere effect in response to the trigger operation for the capturing control on the capturing page.

In an alternative embodiment, the apparatus further includes:

a jump processor, configured to jump from the capturing page to a video editing page in response to a trigger operation for a preset ending capturing control on the capturing page; the target result video is displayed on the video editing page;

a synthesized processor, configured to determine a target sticker effect based on a lyric information corresponding to the target music, and synthesize the target sticker effect into the target result video that is displayed on the video editing page according to a preset display style to obtain a synthesized result video.

In an alternative embodiment, the apparatus further includes:

a monitoring processor, configured to start timing upon detecting the jumping from the capturing page to the video editing page;

a reminding display processor, configured to display a preset reminding effect on the video editing page at the end of the timing in a case where a publishing operation is not detected in a process of the timing; the preset reminding effect is configured to remind a user to trigger the publishing operation for the synthesized result video.

In an alternative embodiment, the apparatus further includes:

a comment display processor, configured to display a comment prop corresponding to a comment operation on a play page of a first video in response to the comment operation for the first video; the first video and the target result video belong to the same video type.

In an alternative embodiment, the atmosphere effect includes at least one selected from a background effect, a prop effect and a lighting effect, and the prop effect includes at least one selected from a smoke effect, a musical instrument effect and a user prop effect.

In an alternative embodiment, the characteristics of the target music include a genre of the target music and/or a preference group corresponding to the target music.

In the video generation apparatus provided by the embodiments of the present disclosure, firstly, when a selection operation for a target music is received, an atmosphere effect corresponding to the target music is displayed on a capturing page, and when a trigger operation for a capturing control on the capturing page is received, a target result video is generated based on the displayed atmosphere effect, where the audio in the target result video is obtained based on the target music, and the atmosphere effect corresponding to the target music is determined based on characteristics of the target music. When the video recording is realized based on the target music, the embodiments of the present disclosure can generate the target result video with the atmosphere effect related to the characteristics of the target music. It can be seen that the embodiments of the present disclosure can enrich the gameplay of the video capturing function and enhance user's experience for video capturing.

In addition to the above method and apparatus, the embodiments of the present disclosure also provide a computer-readable storage medium, instructions are stored on the computer-readable storage medium, and the instructions, upon being executed by a terminal device, cause the terminal device to implement the video generation method described in the embodiments of the present disclosure.

Embodiments of the present disclosure also provide a computer program product, which includes computer program/instructions, and the computer program/instructions, upon being executed by a processor, implements the video generation method described in the embodiments of the present disclosure.

Figure 7:
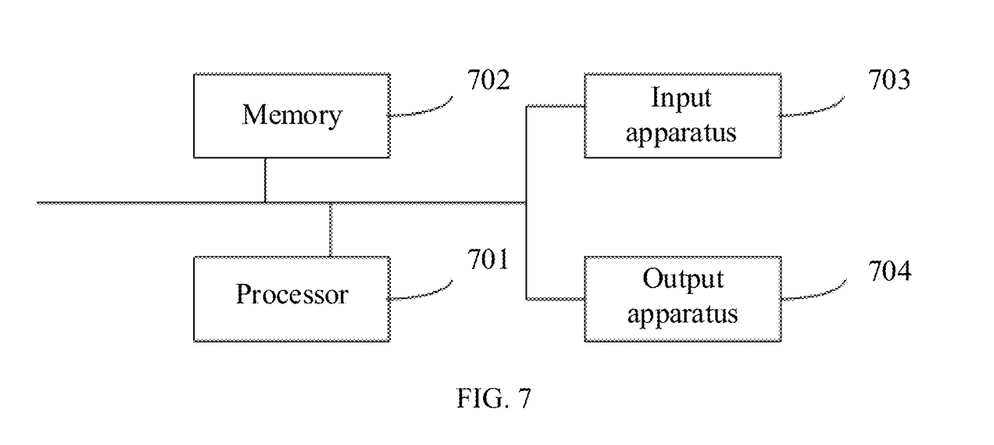
FIG. 7 is a schematic structural diagram of a video generation device provided by embodiments of the present disclosure.

In addition, embodiments of the present disclosure further provide a video generation device, as shown in FIG. 7, which may include:

a processor 701, a memory 702, an input apparatus 703 and an output apparatus 704. The number of the processor 701 in the video generation device may be one or more, and one processor is taken as an example in FIG. 7. In some embodiments of the present disclosure, the processor 701, the memory 702, the input apparatus 703 and the output apparatus 704 may be connected through a bus or other means, and the connection through the bus is taken as an example in FIG. 7.

The memory 702 may be configured to store software programs and modules, and the processor 701 executes various functional applications and data processing of the video generation device by running the software programs and modules stored in the memory 702. The memory 702 may mainly include a program storage region and a data storage region, and the program storage region may store an operating system, application programs required by at least one function, etc. In addition, the memory 702 may include high-speed random-access memory, and may also include non-volatile memory, such as at least one magnetic disk memory, flash memory, or other volatile solid-state memory. The input apparatus 703 may be configured to receive inputted digital or character information and generate signal input related to user settings and function control of the video generation device.

Specifically, in the present embodiment, the processor 701 may follow the following instructions to load executable files corresponding to the processes of one or more application programs into the memory 702, and the processor 701 may run the application programs stored in the memory 702 to realize various functions of the above-mentioned video generation device.

It should be noted that in the present disclosure, relational terms, such as "first" and "second", etc., are merely used to distinguish one entity or operation from another entity or operation, and do not necessarily require or imply that there is any such factual relationship or order between these entities or operations. Moreover, the terms "including", "comprising" or any other variation thereof are intended to cover non-exclusive inclusion, so that a process, method, article or device that includes a series of elements includes not only these elements, but also other elements that are not explicitly listed or elements that are inherent to such process, method, article or device. Without further restrictions, an element defined by the phrase "including a/an . . . " does not exclude the existence of other identical elements in the process, method, article or device that includes the element.

What is described above is only the specific embodiments of the present disclosure, so that those skilled in the art can understand or realize the present disclosure. Many modifications to these embodiments will be obvious to those skilled in the art, and the general principles defined herein may be implemented in other embodiments without departing from the spirit or scope of the present disclosure. Therefore, the present disclosure is not limited to the embodiments described herein, but to be accorded the widest scope that is consistent with the principles and novel features disclosed herein.

What is claimed is:

1. A video generation method, wherein the method comprises:
displaying an atmosphere effect corresponding to a target music on a capturing page when real-time video capturing is performed in response to a selection operation of the target music, wherein the atmosphere effect corresponding to the target music is determined based on characteristics of the target music; and
generating a target result video based on the atmosphere effect and a video captured in real time in response to a trigger operation for a capturing control on the capturing page, wherein an audio in the target result video is obtained based on the target music.

2. The method according to claim 1, wherein before generating the target result video based on the atmosphere effect, the method further comprises:
displaying evaluation props on the capturing page based on audio data that is input from a microphone in a process of video capturing; wherein the evaluation props are determined based on a matching degree between the audio data and the target music; and
correspondingly, generating the target result video based on the atmosphere effect in response to the trigger operation for the capturing control on the capturing page comprises:
generating the target result video based on the evaluation props and the atmosphere effect in response to the trigger operation for the capturing control on the capturing page.

3. The method according to claim 1, wherein after the generating the target result video based on the atmosphere effect, the method further comprises:
jumping from the capturing page to a video editing page in response to a trigger operation for a preset ending capturing control on the capturing page; wherein the target result video is displayed on the video editing page; and
determining a target sticker effect based on a lyric information corresponding to the target music, and synthesizing the target sticker effect into the target result video that is displayed on the video editing page according to a preset display style to obtain a synthesized result video.

4. The method according to claim 3, wherein after jumping from the capturing page to the video editing page in response to the trigger operation for the preset ending capturing control on the capturing page, the method further comprises:
starting timing upon detecting the jumping from the capturing page to the video editing page; and
displaying a preset reminding effect on the video editing page at the end of the timing in a case where a publishing operation is not detected in a process of the timing; wherein the preset reminding effect is configured to remind a user to trigger the publishing operation for the synthesized result video.

5. The method according to claim 1, wherein the method further comprises:
displaying a comment prop corresponding to a comment operation on a play page of a first video in response to the comment operation for the first video; wherein the first video and the target result video belong to a same video type.

6. The method according to claim 1, wherein the atmosphere effect includes at least one selected from a background effect, a prop effect and a lighting effect, and the prop effect includes at least one selected from a smoke effect, a musical instrument effect and a user prop effect.

7. The method according to claim 1, wherein the characteristics of the target music include a genre of the target music and/or a preference group corresponding to the target music.

8. A non-transitory computer-readable storage medium, wherein instructions are stored on the computer-readable storage medium, and the instructions, upon being executed by a terminal device, cause the terminal device to implement the method according to claim 1.

9. A video generation method, wherein the method comprises:
displaying an atmosphere effect corresponding to a target music on a capturing page in response to a selection operation of the target music; wherein the atmosphere effect corresponding to the target music is determined based on characteristics of the target music; and
generating a target result video based on the atmosphere effect in response to a trigger operation for a capturing control on the capturing page; wherein an audio in the target result video is obtained based on the target music;
before generating the target result video based on the atmosphere effect in response to the trigger operation for the capturing control on the capturing page, the method further comprises:
displaying a first canvas and a second canvas on the capturing page in response to a trigger operation for a preset co-capturing control on the capturing page; wherein the first canvas is configured to render a capturing picture of a front camera, and the second canvas is configured to render a capturing picture of a rear camera; and
correspondingly, generating the target result video based on the atmosphere effect in response to the trigger operation for the capturing control on the capturing page comprises:
generating the target result video based on the capturing picture on the first canvas, the capturing picture on the second canvas and the atmosphere effect in response to the trigger operation for the capturing control on the capturing page.

10. A device, comprising: a memory, a processor, and computer program that is stored on the memory and executable on the processor, wherein the processor, upon executing the computer program, implements:

displaying an atmosphere effect corresponding to a target music on a capturing page when real-time video capturing is performed in response to a selection operation of the target music; wherein the atmosphere effect corresponding to the target music is determined based on characteristics of the target music; and     generating a target result video based on the atmosphere effect and a video captured in real time in response to a trigger operation for a capturing control on the capturing page, wherein an audio in the target result video is obtained based on the target music.

11. The device according to claim 10, wherein the atmosphere effect includes at least one selected from a background effect, a prop effect and a lighting effect, and the prop effect includes at least one selected from a smoke effect, a musical instrument effect and a user prop effect.

12. The device according to claim 10, wherein the characteristics of the target music include a genre of the target music and/or a preference group corresponding to the target music.

* * * * *